Jan. 29, 1957         F. A. HASSMAN         2,779,250

AUTOMATIC CONTROL MECHANISM

Filed July 11, 1952         4 Sheets-Sheet 1

INVENTOR.
FRED A. HASSMAN
BY
H. N. Parsons & C. W. Wright
ATTORNEYS.

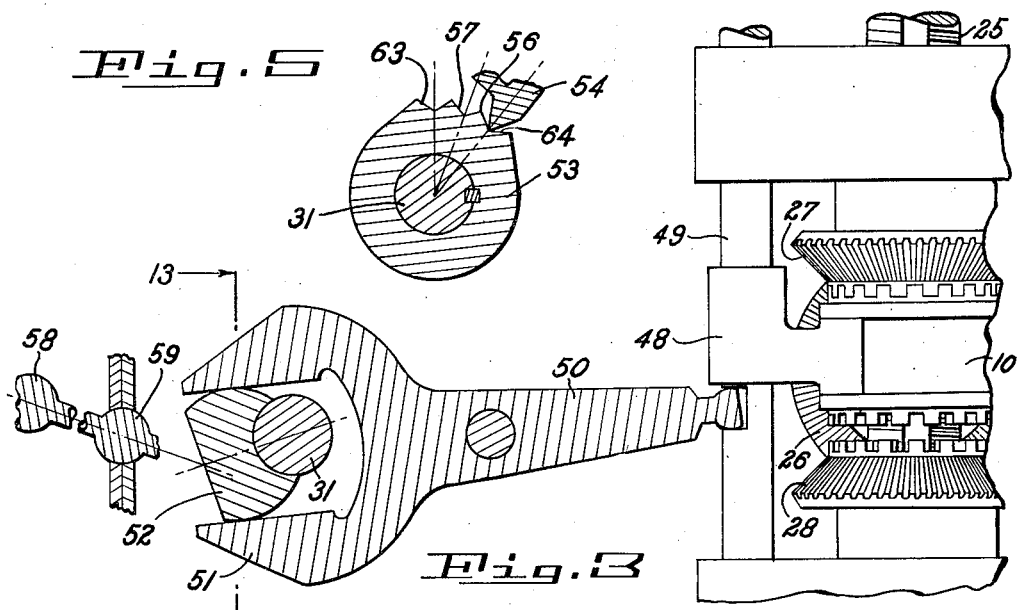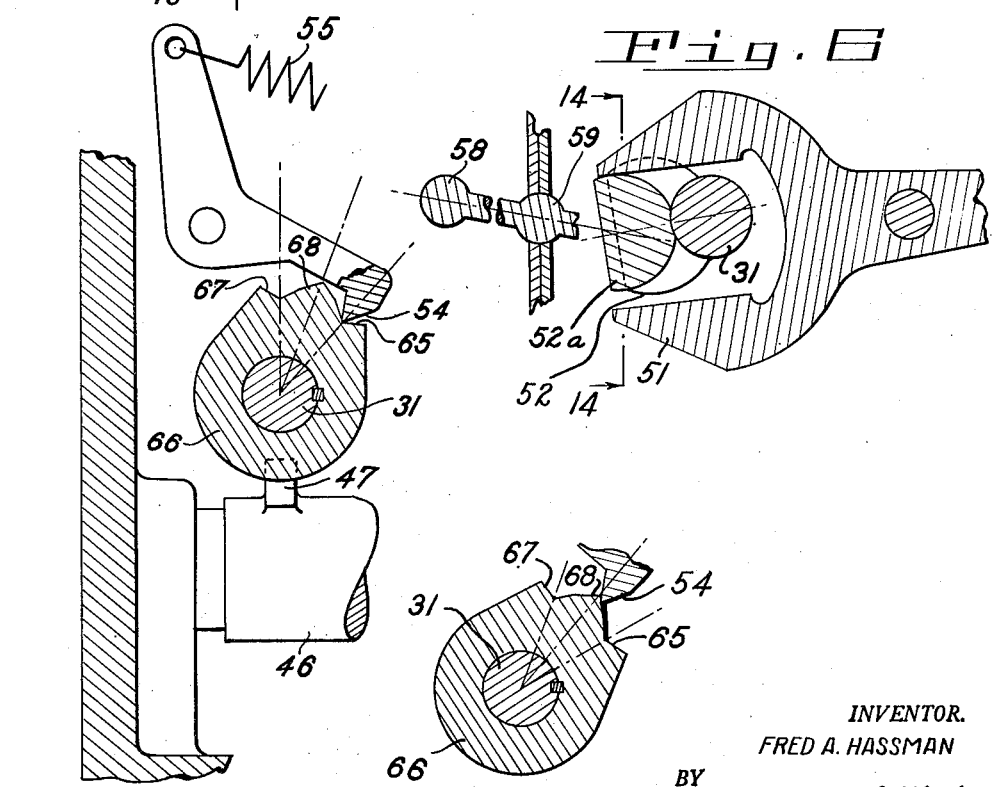

Jan. 29, 1957  F. A. HASSMAN  2,779,250
AUTOMATIC CONTROL MECHANISM
Filed July 11, 1952  4 Sheets-Sheet 3
Fig. 8
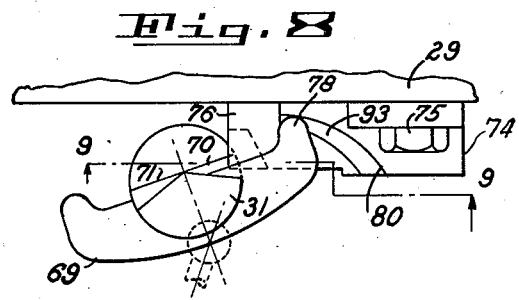
Fig. 10
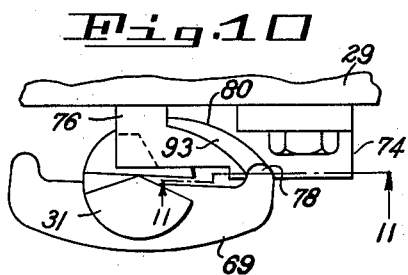
Fig. 9
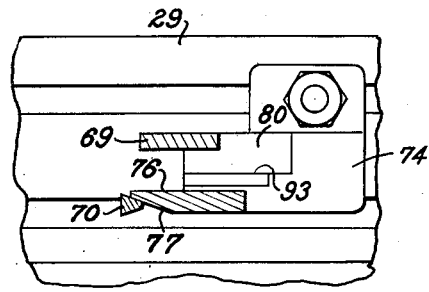
Fig. 11
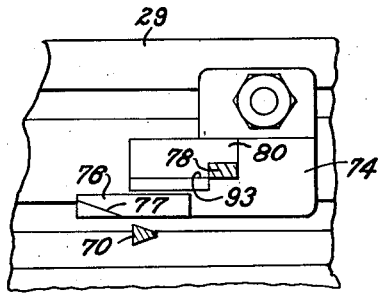
Fig. 12
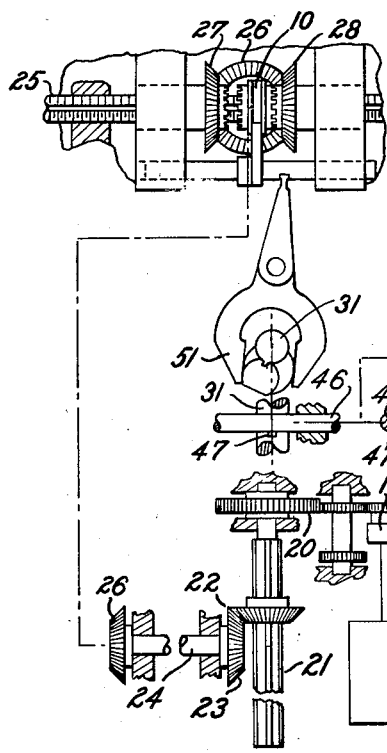
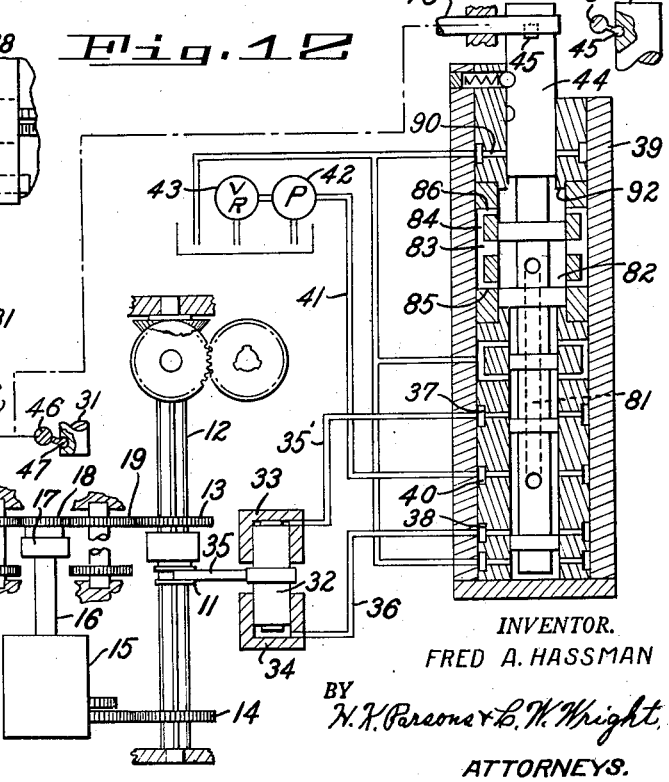
INVENTOR.
FRED A. HASSMAN
BY
H. K. Parsons & L. W. Wright
ATTORNEYS.

Jan. 29, 1957   F. A. HASSMAN   2,779,250
AUTOMATIC CONTROL MECHANISM
Filed July 11, 1952   4 Sheets-Sheet 4
Fig.13
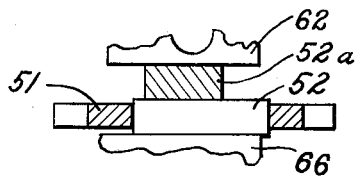
Fig.16
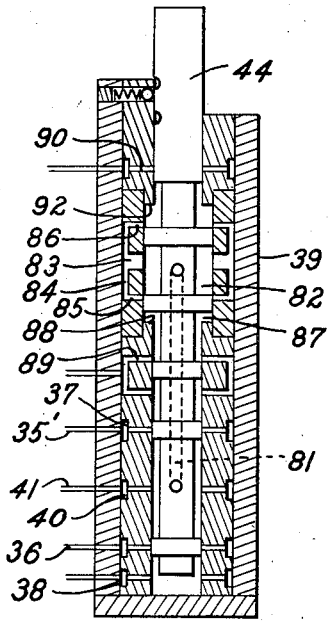
Fig.14
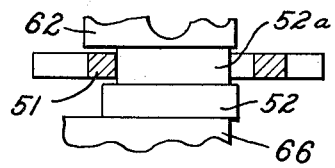
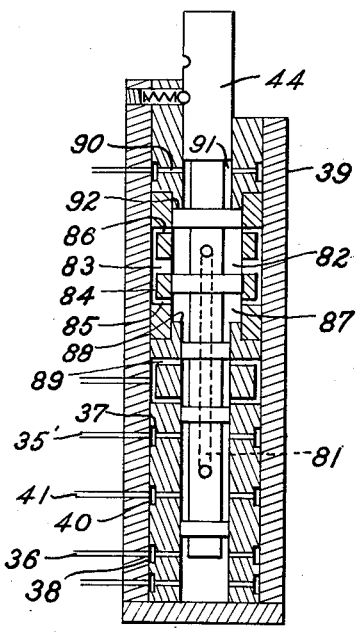
Fig.15
INVENTOR.
FRED A. HASSMAN
BY
N. K. Parsons & C. W. Wright.
ATTORNEYS.

United States Patent Office 2,779,250
Patented Jan. 29, 1957

2,779,250

AUTOMATIC CONTROL MECHANISM

Fred A. Hassman, Cincinnati, Ohio, assignor to The Cincinnati Milling Machine Co., Cincinnati, Ohio, a corporation of Ohio Application July 11, 1952, Serial No. 298,303

6 Claims. (Cl. 90—21)

This invention relates to machine tools and more particularly to automatic control mechanism therefor.

This invention is an improvement on the construction shown in Patent 2,393,928 which has to do with trip control mechanisms for machine tools such as milling machines for automatically controlling the rate and direction thereof including automatic reversal. Due to the construction of the mechanism shown in the patent, it is necessary for the table to be traveling at a fast rate to effect automatic reversal of the direction of movement. This is undesirable, especially when the cutter is in a cut, such as cutting up to a shoulder, because sudden change of rate would probably cause breakage of the cutter. In the patented structure it thus becomes necessary to set the mechanism to effect an automatic stop at the desired point and then for the operator to manually effect the reversal to start the movement in the return direction. This, of course, results in loss of time and constant attention on the part of the operator, and since after a cutting operation has been completed, it is desirable to retract the parts at a rapid traverse rate it is necessary for the operator not only to change the direction of movement but also to change the rate, all of which makes automatic cyclic operation impossible.

One of the objects of this invention therefor is to improve upon the construction of said patent to make it possible to effect an automatic reversal without changing the rate before the reversal is effected.

Another object of this invention is to synchronize the automatic tripping operations to occur simultaneously, whereby the rate and direction are changed at the same time.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings, in which like reference numerals indicate like or similar parts:

Figure 3 is a horizontal section on the line 3—3 of Figure 2 showing the table reversing clutch and actuating mechanism therefor.

Figure 4 is a section on the line 4—4 of Figure 2 showing the two position detent mechanism.

Figure 5 is a section on the line 5—5 of Figure 2 showing the three position detent mechanism.

Figure 6 is a view similar to Figure 3 with the trip plunger in its rapid traverse position.

Figure 7 is a view of the two position detent mechanism just passing over center.

Figure 8 is a plan view of the trip elements as viewed on the line 8—8 of Figure 1 showing the trip dog about to engage the trip plunger as the table feeds toward the left in that view.

Figure 9 is a section on the line 9—9 of Figure 8.

Figure 10 is a view similar to Figure 8 showing the trip plunger almost to the firing position.

Figure 11 is a section on the line 11—11 of Figure 10.

Figure 12 is a diagrammatic view of the transmission elements and controls connected thereto and showing the parts in a rapid traverse position.

Figure 13 is a sectional view on the line 13—13 of Figure 3.

Figure 14 is a sectional view similar to Figure 13 with the trip plunger moved down to its rapid traverse, as viewed on the line 14—14 of Figure 6.

Figure 15 is a view of the rapid traverse control valve in its feed position.

Figure 16 is a view of the rapid traverse control valve in tripping position ready to fire to its rapid traverse position.

Figure 1:
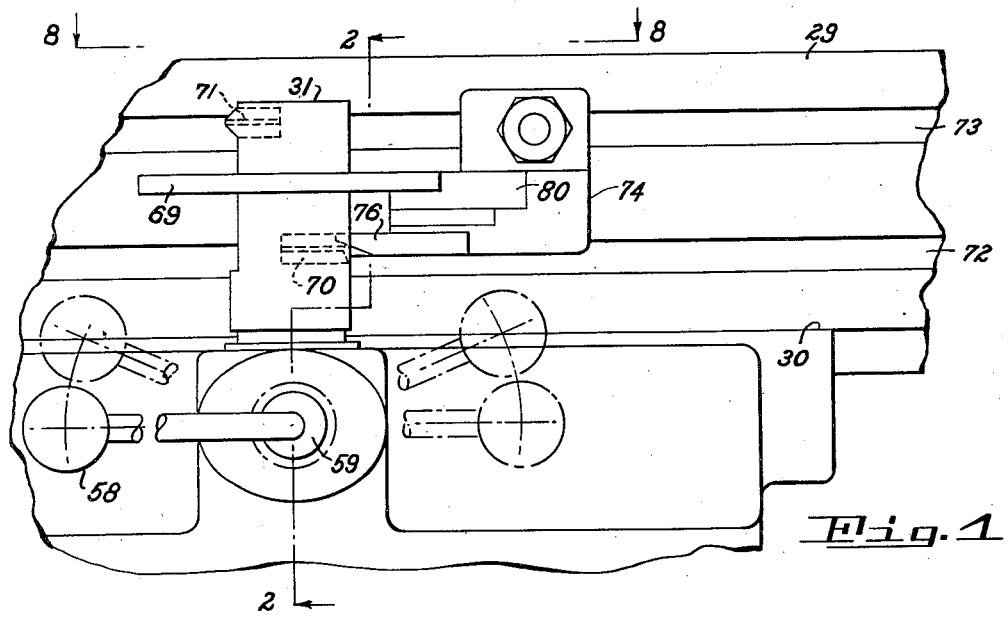
Figure 1 is a front elevation of a portion of a milling machine table and its support, showing the relationship of the trip elements for controlling support movement.

For a clearer understanding of the invention it is desired to point out that in the disclosure of the patent supra there is a single trip control plunger acting as an intermediate agent between the traveling trip elements on the table, and the transmission control parts, for translating the motion received from the traveling elements into positioning movements of the control parts, such as clutches of the transmission, to automatically produce changes in the rate and direction of movement of the traveling table.

The transmission is of the type diagrammatically indicated in Figure 12 in which the reference numeral 10 indicates the shiftable reversing clutch which controls direction, and the reference numeral 11 indicates the rate determining clutch. Power for driving the table through these clutches is derived from a constantly running shaft 12 which supports a gear 13, known as the rapid traverse drive gear, and adapted to be connected to the shaft 12 by the shifting of clutch 11; and a gear 14 secured to the shaft 12 and known as the feed drive gear. The gear 14 drives, through a variable feed transmission 15 of any suitable type, an output feed shaft 16 that is connected through an overrunning clutch 17 to a gear 18. Thus, the gear 18 is constantly driven in one direction at all times by the shaft 12. However, when the clutch 11 is engaged, the gear 18 is driven at a faster rate by the rapid traverse gear 13 which is connected thereto through intermediate gearing, indicated generally by the reference numeral 19. This is possible because the gear 18 is connected to the shaft 16 by the overrunning clutch 17. The gear 18 drives, through intermediate gearing represented by the reference numeral 20, a spline shaft 21 which is connected to a pair of bevel gears indicated by the reference numeral 22. The driven gear 23 of this pair is attached to the lower end of a shaft 24 which is centrally positioned, as shown in Figure 2, beneath the table drive screw 25 so that the bevel gear 26 attached to the other end of the shaft 24 intermeshes with bevel gears 27 and 28 supported co-axially of the screw 25.

The reversing clutch 10 is splined on the screw 25 and has clutch teeth on opposite sides for engagement with corresponding clutch teeth on the opposing faces of the gears 27 and 28 whereby engagement with the gear 27 will drive the screw in one direction, and engagement with the gear 28 will cause the screw to be driven in the opposite direction.

Figure 2:
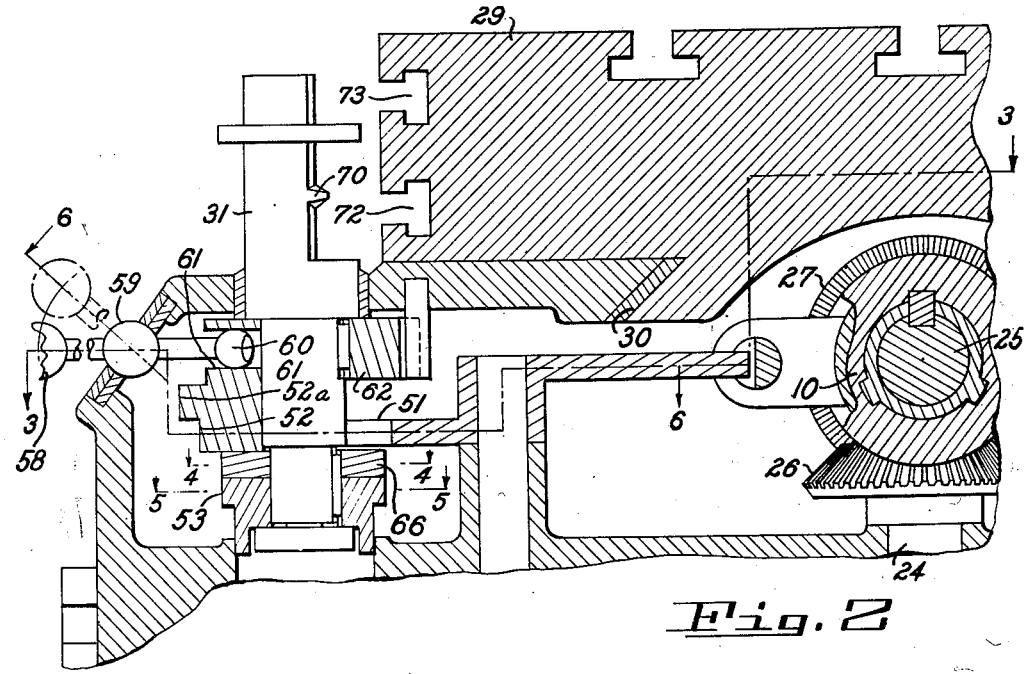
Figure 2 is a vertical section on the line 2—2 of Figure 1.

A trip plunger, which acts as the intermediate agent between the trip dog elements carried by the table 29 slidable on guideways 30, and the transmission elements, is indicated by the reference numeral 31 as more particularly shown in Figures 1 and 2. The rapid traverse clutch 11 is operatively connected to the trip plunger through the following mechanism. A piston member 32 in Figure 12 is slidably mounted in opposed cylinders 33 and 34, and is operatively connected to the clutch member 11 by a shifter fork 35. Thus, by admission of fluid pressure to the cylinder 33 the clutch is disengaged and upon admission of pressure to the cylinder 34 the clutch is engaged. The cylinders 33 and 34 are connected by channels 35' and 36 to ports 37 and 38 respectively of a rapid traverse control valve 39. This valve has a pressure port 40 which is supplied through channel 41 by a suitable pump 42 having a relief valve 43. A valve plunger 44 is slidably mounted in the valve housing 39 for alternatively connecting the pressure port 40 to the motor ports 37 or 38. The plunger 44 is operatively connected by a crank arm 45 to a shifter rod 46 which, as diagrammatically indicated in Figure 12, is connected by a second crank arm 47 to the trip plunger 31. The actual construction is more particularly shown in Figure 4 in which the shifter rod 46 is connected by an integral crank arm 47 to the periphery of the trip plunger 31 whereby a predetermined axial movement of the plunger 31 will cause rotation of the shifter rod 46.

Thus, when the trip plunger is in its upper position, it positions the valve 44 in its feed position as shown in Figure 15, and when in its lower position, it positions the valve 44 in its rapid traverse position as shown in Figure 12. The reversing clutch 10, as shown in Figure 3, has a shifter fork 48 which is slidably mounted on a shifter rod 49 which, in turn, is connected by a lever 50 to the trip plunger 31. In this case, the lever 50 is provided with a bifurcated end 51 which without lost motion embraces an eccentric cam member 52, Figure 13, keyed to the trip plunger 31 when the trip plunger is in its upper feed position whereby as the trip plunger is rotated the lever will move in unison therewith. When the trip plunger is in its lower rapid traverse position, the end 51 embraces a second cam portion 52a, Figure 14, on the plunger 31 with lost motion whereby a load and fire action may be obtained to effect automatic reversal as shown in Figure 6.

It is, of course, desirable that suitable detent mechanism be provided for holding the trip plunger in definite positions, as well as serve as automatic tripping means to snap the plunger into these positions when changes are made, and in Figure 5 there is shown a three-position detent member 53 which is keyed to the plunger 31, and which cooperates with a detent pawl 54 which is spring actuated by spring 55 as shown in Figure 4. It will now be seen that as the trip plunger is rotated when located axially in feed position in a clockwise direction as viewed in Figures 3 and 5, that the reversing clutch 10 will be moved out of engagement with the gear 27, and when the pawl rides over the peak 56 it will snap into the notch 57 and thereby position and hold the clutch in a neutral or stop position. Since this will disconnect power from the lead screw, the table will stop and further rotation of the trip plunger will cease. It then becomes necessary for the operator through the medium of the manual control lever 58, which is supported on a ball pivot 59, as shown in Figure 2, to shift the plunger in a desired direction to reengage the clutch when further movement of the table is desired. The ball pivot is intermediate the length of the manual control lever, and the lever has a ball end 60 which fits in a socket 61 of the member 62 which is keyed to the plunger 31. By means of this construction the operator is enabled to rotate the plunger, or move it axially by proper manipulation of the lever 58. The various positions to which the lever may be moved are shown in Figure 1. The detent member 53 is provided with another notch 63 which holds the trip plunger in position when the clutch 10 is shifted into engagement with the gear 28.

When the trip plunger is in engagement with either notch 63 or 64 shown in Figure 5, it may be moved axially downward to rapid traverse position to change the rate of support movement. In so doing, the pawl 54 will slide out of engagement with the notch 64 of detent member 53 and into engagement with a notch 65 in a second detent member 66 attached to the plunger 31. Or, if the detent pawl 54 is in engagement with the notch 63 in member 53 it will slide out of engagement with the notch 63 and into engagement with a second notch 67 in the member 66. However, when the pawl 54 is in engagement with the notch 57 shown in Figure 5, the trip plunger cannot be moved downward because the pawl 54 will be in interference with the peak 68 located between the notches 65 and 67.

The movements of the plunger are automatically effected by trip dogs on the table which by virtue of table movement causes actuation of the trip plunger which is stationed adjacent the edge of the table. Automatic rotation of the plunger from either of its feeding positions to a central stop position is effected by suitable concave shaped dogs, such as shown in the patent supra. These dogs engage the tip of the wing 69 which is integral with the plunger and which extends from opposite sides thereof longitudinally of the table.

Axial movement of the plunger is effected by other dogs having bevel cam surfaces which are adapted to engage axially and circumferentially spaced lugs 70 and 71 projecting from the table side of the plunger, the circumferential spacing making it possible for one lug to be in an operative position for each direction of table movement while the other is in an inoperative position. The table is provided with spaced T slots for supporting the dogs in axially spaced relationship for engagement with the respective axially spaced lugs. Thus, the dogs in one T slot are effective during one direction of table movement to act on one lug, and te dogs in the other T slot are ineffective because the rotatable position of the plunger has withdrawn one lug from the path of movement of one set of dogs.

As previously mentioned, and from the construction shown in the drawings, it is obvious that in order to reverse the table automatically, the trip plunger must be axially positioned in a rapid traverse position in order to utilize the two position detent mechanism to obtain automatic reversal. It is desirable, however, that the table be reversed while in feed and restart in the reverse direction at a rapid traverse rate. From the construction of the trip plunger as explained herein it will be obvious that this requires a rotary movement of the plunger to change direction and an axial movement of the plunger to change the rate.

This is accomplished automatically in the following manner. In Figures 8, 9, 10, and 11 the table 29 is shown as traveling to the left at a feed rate and the control parts are necessarily positioned to produce this effect. This means that the trip plunger has assumed a counterclockwise rotated position, as viewed in plan in Figure 8, to engage the direction clutch shown in Figure 3 to effect movement of the table to the left. In this rotated position the plunger automatically places the lower lug 70 on the trip plunger in operative relation to the table. It also causes withdrawal of the upper lug 71 from the path of any trip dogs on the table. The trip plunger has also assumed an upper or feed position which, through the shifter rod 46 shown in Figure 12, has positioned the valve plunger 44 in the position shown in Figure 15 to admit fluid pressure to channel 35' and thereby disengage the rapid traverse clutch 11.

In this invention a single dog has been provided to cooperate with the plunger to simultaneously effect rotation and axial movement of the plunger and synchronize the automatic tripping of each movement. The means for effecting the axial movement of the plunger completes its action before the rotating means so that the axial movement has passed the halfway point and is ready to fire when the rotary movement reaches the firing point.

Means, however, are provided for preventing completion of the axial movement until the rotary movement has reached its firing point. The rotary movement is kept going because the table continues to move in spite of the fact that the rapid traverse has reached the middle position due to the use of an overrunning clutch in the rapid traverse drive whereby the feed is always on until the rapid traverse mechanism takes over. Thus, there is no dead point in the application of power to drive the reverse clutch.

In Figure 8, the dog 74 is shown attached to the table by the T-bolt 75, and this dog has a lower plate portion 76, the underside of which is beveled as shown in Figure 9 at 77 so that as the dog proceeds toward the left the beveled surface 77 engages the lug 70 projecting from the side of the plunger 31 and depresses the plunger. At the same time that these parts engage, the tip 78 of the wing 69 engages the concave surface 80 formed on the upper portion of the dog 74. As the dog progresses in its movement, the cam surface 77 pushes the plunger down a predetermined distance while at the same time the concave surface 80 causes rotation of the plunger.

The rotary movement of the trip plunger acts through the mechanism shown in Figure 3 to withdraw the clutch 10 from engagement with the gear 27, but before the disengagement has been completed which would result in loss of driving power to the table, the downward movement of the plunger has been completed sufficiently to cause normally firing of the rapid traverse valve which is accomplished hydraulically, but this firing is delayed until the rotary detent mechanism is ready to fire, so that they both fire together.

The hydraulic pressure of valve 39 is also utilized for firing the valve and as shown in Figures 12, 15, and 16, this pressure at port 40 is conducted through an axial bore 81 in the valve plunger 44 to the annular groove 82 in the plunger, which groove is in constant communication with port 83. By means of passage 84, port 83 is connected to ports 85 and 86. In the feed position shown in Figure 15, the pressure passes through port 85 into the valve space 87 so that due to the differential area 88, it holds the plunger in its upward or feed position. As the plunger moves down, Figure 16, it closes ports 85 and 86 when it reaches the mid-position and also closes exhaust ports 89 and 90.

The parts are so adjusted that the cam surface 77 on the dog 74 moves the valve plunger slightly beyond the mid-position enough to crack open the port 86, so that the fluid pressure will enter space 91, and due to the differential area 92, automatically acts to push the plunger downward, to the limit of its movement. However, when the wing 69 of the trip plunger has engaged the horizontal flat surface 93 formed on the dog 74 as shown in Figure 11, it will delay further downward movement of the plunger, even although it is hydraulically urged in that direction.

The table, however, continues to move until the tip 78 of the wing 69 rides off of the surface 93. At this point, the detent 54, shown in Figure 4, rides over the peak 68 and the load and fire mechanism becomes operative to complete rotation of the plunger and automatic shifting of the clutch 10 into engagement on its opposite side with the gear 28 as shown in Figure 12. When the load and fire mechanism becomes operative to complete the rotation of the plunger, the tip 78 becomes disengaged from the surface 93 and the hydraulic load and fire mechanism becomes operative to complete shifting of the rapid traverse valve to change the rate. It will thus be seen that the mechanism is so timed that immediately upon operation of the parts to reverse the direction of movement that the plunger is automatically shifted to effect a change in rate. Thus, the surface 93 acts to synchronize the automatic tripping of both mechanisms and they occur simultaneously. The table thus continues to feed up to the point of reversal, but as soon as the reversal is effected it travels in the new direction at a rapid traverse. This new automatic cyclic advantage is thus obtained without interfering or lessening all the other advantages that this type of control mechanism is capable of.

It is important to note that the downward movement of the plunger starts before rotary movement, and this makes it possible to effect a relative sliding movement of the pawl 54 from notch 64 in member 53 into notch 65 in member 66 before interference develops. At the same time, large cam 52 is being axially withdrawn from the jaws of the bifurcated arm while it is being rotated; and before the firing point is reached, it has been wholly withdrawn and the smaller cam 52a inserted. Since the cam 52a is smaller, there will be some lost motion to take up, which means that there will be rotation of the plunger without movement of the clutch lever arm but the axial movement will continue until the wing engages the tip on the dog, whereby the axial movement has been completed to the half-way point or sufficiently beyond it to cause firing of the reverse clutch.

There has thus been provided a very advantageous improvement to the trip control mechanism shown in the patent supra, extending its repertoire of automatic cycles that it can control.

What is claimed is:

1. In a trip control mechanism for the driving mechanism of a machine slide having a trip plunger stationed adjacent the slide and operatively connected to said drive mechanism to effect changes in the rate and direction produced thereby in response to axial and rotary movements respectively of the plunger, each of said movements having a tripping position therein, the combination therewith of dog means movable with the slide into engagement with the plunger for moving the plunger axially and rotatively to its respective tripping positions, independent automatically operable tripping means effective on the plunger when in said tripping positions to automatically complete said movements, and means for synchronizing the respective tripping operations to effect them simultaneously, including a stop on the dog means for preventing operation of one of said automatically operable tripping means until the other is ready to operate.

2. In a trip control mechanism for the driving mechanism of a machine slide including a reversing clutch and a feed rapid traverse control clutch, having a trip plunger stationed adjacent the slide and operatively connected to said clutches for actuation thereof in response to axial and rotary movements respectively thereof, the combination of a trip dog attached to the slide and movable thereby into engagement with the plunger to initiate the respective movements thereof, independent automatically operable tripping means effective on the plunger to automatically complete said movements, and means on the dog for synchronizing the respective tripping operations to effect them simultaneously, including a stop to delay the completion of one tripping movement until the trip means for the other movement is ready to operate.

3. In a trip control mechanism for the transmission of a machine slide including serially arranged clutches for determining the rate and direction of said slide, a trip plunger operatively connected to said clutches and subject to axial movement for actuating one of said clutches, and rotary movement for actuating the other clutch, the combination of a trip dog on the table having actuating surfaces engageable with co-acting surfaces on the plunger for initiating said axial and rotary movements of the plunger during power movement of the slide, independent automatically operable tripping means effective on the plunger to automatically complete the respective movements initiated by the trip dog, and means on the dog including an additional surface on the dog co-acting with a rotatable surface on the plunger for synchronizing the tripping operations to effect shifting of the clutches simultaneously.

4. In a trip control mechanism for the transmission to a machine slide, said transmission including clutches for controlling the rate and direction respectively of slide movement, a trip plunger operatively connected for shifting said clutches and having projections thereon for effecting axial movement and rotary movement respectively of said plunger, the combination of a dog carried by the slide for engaging said projections during slide movement to initiate axial and rotary movement of said plunger, independent automatically operable tripping means effective on the plunger to complete said movements and shifting of said clutches, and stop means on the dog for delaying actuation of the plunger by one of said tripping means until the other tripping means becomes effective whereby the tripping operations are effected simultaneously.

5. In a trip control mechanism, the combination of a trip plunger supported for axial and rotary movement having a wing portion extending laterally from its axis and also a lug extending from its axis normal to said wing, a dog adapted to be traversed by a movable support relative to said plunger to effect actuation thereof, independent automatically operable tripping means effective on the plunger to automatically complete movements thereof initiated by said dog, said dog having a first cam surface engageable with the edge of said wing for rotating the plunger and a second cam surface for engaging said lug to move the plunger axially to a tripping position before the first cam surface has completed rotation of the plunger to a tripping position, and a stop surface on the dog engageable with the under surface of said wing to prevent the axial tripping of the plunger until the wing has been rotated out of engagement with said stop surface whereby the final completion of both movements of the plunger will occur simultaneously.

6. In a trip control mechanism for the transmission of a machine slide including a reversing clutch and a feed rapid traverse control clutch, said mechanism including a trip plunger, subject to axial and rotary movements, means operatively connecting the plunger to the feed rapid traverse clutch to effect shifting thereof in response to axial movement of the plunger, means operatively connecting the plunger to the reversing clutch to effect shifting thereof in response to rotary movement of the plunger, the combination of a trip dog having normally arranged trip surfaces thereon mounted on the slide for movement therewith into engagement with co-acting surfaces on the plunger to effect axial and rotative movements thereof to axial and rotative trip positions, independent automatically operable tripping means effective on the plunger to automatically complete the axial and rotative movements of the plunger and effect final shifting of said clutches, and means on the dog for synchronizing the respective tripping operations to effect simultaneous shifting of said clutches including a stop surface on the dog engageable by an abutment on the plunger as it moves axially to its tripping position, said abutment surface being responsive to rotative movement of the plunger and rotatable out of engagement with said stop surface when the plunger reaches its rotative tripping position.

References Cited in the file of this patent

UNITED STATES PATENTS

| | | |
|---|---|---|
| 1,125,686 | Hazelton et al. | Jan. 19, 1915 |
| 1,390,706 | Hazelton | Sept. 13, 1921 |
| 1,727,424 | Archea | Sept. 10, 1929 |
| 1,747,903 | Nenninger | Feb. 18, 1930 |
| 1,978,353 | Nenninger et al. | Oct. 23, 1934 |
| 2,042,245 | Archea | May 26, 1936 |
| 2,393,928 | Nenninger et al. | Jan. 29, 1946 |